(12) United States Patent
Dominguez-Caballero et al.

(10) Patent No.: US 9,110,291 B2
(45) Date of Patent: Aug. 18, 2015

(54) ULTRA-HIGH EFFICIENCY COLOR MIXING AND COLOR SEPARATION

(75) Inventors: Jose Dominguez-Caballero, Portland, OR (US); Rajesh Menon, Salt Lake City, UT (US)

(73) Assignees: Massachusetts Institute of Technology, Cambridge, MA (US); University of Utah Research Foundation, Salt Lake City, UT (US)

( * ) Notice: Subject to any disclaimer, the term of this patent is extended or adjusted under 35 U.S.C. 154(b) by 60 days.

(21) Appl. No.: 13/825,991

(22) PCT Filed: Sep. 16, 2011

(86) PCT No.: PCT/US2011/051916
§ 371 (c)(1),
(2), (4) Date: Apr. 30, 2013

(87) PCT Pub. No.: WO2012/047483
PCT Pub. Date: Apr. 12, 2012

(65) Prior Publication Data
US 2013/0208273 A1    Aug. 15, 2013

Related U.S. Application Data

(60) Provisional application No. 61/404,062, filed on Sep. 27, 2010.

(51) Int. Cl.
*G02F 1/1335*    (2006.01)
*G02B 27/10*    (2006.01)
(Continued)

(52) U.S. Cl.
CPC ........... *G02B 27/1006* (2013.01); *F21S 48/115* (2013.01); *G01J 3/0205* (2013.01);
(Continued)

(58) Field of Classification Search
CPC .......... G02B 27/1006; G02B 27/1013; G02B 27/1086; G01J 3/0205; G01J 3/10; G01J 3/18; G01J 3/0216; G02F 1/133609
USPC ................... 349/57, 61, 95, 201, 62
See application file for complete search history.

(56) References Cited

U.S. PATENT DOCUMENTS 4,239,349 A * 12/1980 Scheffer ................ 349/117
4,984,872 A * 1/1991 Vick ................... 359/15
(Continued)

OTHER PUBLICATIONS

Dominguez-Caballero, "Optimization of the Holographic Process for Imaging and Lithography," Ph.D. Thesis, Massachusetts Institute of Technology, Department of Medical Engineering, 301 pages (Feb. 2010).
(Continued)

*Primary Examiner* — James Dudek
(74) *Attorney, Agent, or Firm* — Sunstein Kann Murphy & Timbers LLP

(57) ABSTRACT

Methods and apparatus for combining or separating spectral components by means of a polychromat. A polychromat is employed to combine a plurality of beams, each derived from a separate source, into a single output beam, thereby providing for definition of one or more of the intensity, color, color uniformity, divergence angle, degree of collimation, polarization, focus, or beam waist of the output beam. The combination of sources and polychromat may serve as an enhanced-privacy display and to multiplex signals of multiple spectral components. In other embodiments of the invention, a polychromat serves to disperse spectral components for spectroscopic or de-multiplexing applications.

8 Claims, 14 Drawing Sheets

(51) Int. Cl.
*G01J 3/02* (2006.01)
*G01J 3/10* (2006.01)
*G01J 3/18* (2006.01)
*G02B 5/32* (2006.01)
*F21S 8/10* (2006.01)
*G01J 3/12* (2006.01)
*G03H 1/08* (2006.01)
*G03H 1/26* (2006.01)

(52) U.S. Cl.
CPC ............... *G01J 3/0216* (2013.01); *G01J 3/10* (2013.01); *G01J 3/18* (2013.01); *G02B 5/32* (2013.01); *G02B 27/1013* (2013.01); *G02B 27/1086* (2013.01); *G02F 1/133609* (2013.01); *G01J 2003/1286* (2013.01); *G03H 1/08* (2013.01); *G03H 2001/262* (2013.01)

(56) References Cited

U.S. PATENT DOCUMENTS

| | | | | |
|---|---|---|---|---|
| 5,774,239 | A | 6/1998 | Feldman et al. | 359/9 |
| 5,877,829 | A * | 3/1999 | Okamoto et al. | 349/74 |
| 6,211,930 | B1 | 4/2001 | Sautter et al. | 349/66 |
| 2001/0052979 | A1 | 12/2001 | Treado et al. | 356/326 |
| 2005/0062928 | A1* | 3/2005 | Yau et al. | 349/201 |
| 2006/0268270 | A1 | 11/2006 | Kerstan et al. | 356/328 |
| 2008/0297809 | A1 | 12/2008 | Holzapfel et al. | 356/614 |
| 2010/0020565 | A1 | 1/2010 | Seward | 362/555 |
| 2010/0095999 | A1 | 4/2010 | Menon | 136/246 |
| 2010/0097703 | A1 | 4/2010 | Menon et al. | 359/565 |
| 2010/0165464 | A1 | 7/2010 | Lin et al. | 359/570 |
| 2011/0042588 | A1 | 2/2011 | Barbastathis et al. | 250/492.22 |

OTHER PUBLICATIONS

Dominguez-Caballero et al., "Design and sensitivity analysis of Fresnel domain computer generated holograms," *Int. J. Nanomanufacturing*, vol. 6, Nos. 1-4, pp. 207-213 (Aug. 2010).

Moharam et al., "Formulation for stable and efficient implementation of the rigorous coupled-wave analysis of binary gratings," *J. Opt. Soc. Am. A*, vol. 12, No. 5, pp. 1068-1076 (May 1995).

Moharam et al., "Stable implementation of the rigorous coupled-wave analysis for surface-relief gratings: enhanced transmittance matrix approach," *J. Opt. Soc. Am. A*, vol. 12, No. 5, pp. 1077-1086 (May 1995).

Korean Intellectual Property Office Authorized Officer, Chu Hyung Suk, International Search Report, together with the Written Opinion of the International Searching Authority, Application No. PCT/US2011/051916, dated May 1, 2012 (8 pages).

* cited by examiner

ULTRA-HIGH EFFICIENCY COLOR MIXING AND COLOR SEPARATION

The present application claims priority from U.S. Provisional Patent Application Ser. No. 61/404,062, filed Sep. 27, 2010, which application is incorporated herein by reference.

TECHNICAL FIELD

The present invention relates to an apparatus and methods for combining, or for separating, spectral components of light and, more particularly, to the use of a polychromat for either of those purposes.

BACKGROUND ART

Color mixing is essential to achieving white light illumination for a variety of applications ranging from street and automotive lighting, to residential, LCD displays and entertainment lighting. White light is typically achieved by illuminating phosphor materials with blue light that emit red and green light. When the three colors combine, the overall emitted light looks white. Such an approach is depicted in FIG. 1, where blue light 101 emitted from a p-n junction illuminates phosphors 102 that emit red 103 and green 104 light. Combination of the three colors produces white light.

The foregoing approach for combining light of distinct colors suffers from three main disadvantages:
- The phosphors tend to degrade over time. This adversely affects the color output lifetime as well as the overall efficiency of the device.
- The overall device has lower efficiency than normal 3-color LED systems. This is primarily due to heat loss from Stokes shift (inelastic scattering) and phosphor-related degradation problems. Hence, the high intrinsic efficiency of the LED is not achieved.
- The system suffers from poor color stability and rendering. Color control for high-quality lighting is difficult with this approach since it is almost impossible to control the relative light output at the different colors.

Another approach to the generation of white light employs three separate LEDs at the primary colors, red, green and blue (RGB). This allows for independent control of intensity at each color, hence much better color gamut in the output light. In the simplest case, the three LEDs are simply packaged in a single, hermetically sealed, case. As no method for high efficiency three-color mixing has been proposed, the three colors mix in the course of propagation and white light is produced. This produces significant non-uniformities in the white light output and it is difficult to control the quality of the white light. Color mixing methods that involve the use of diffusers suffer from intrinsic efficiency losses due to absorption and scattering of the light in the diffuser.

SUMMARY OF EMBODIMENTS OF THE INVENTION

Embodiments of the invention provide for the use of a polychromat, in conjunction with color light sources such as light-emitting diodes, for very efficient color mixing in lighting, display, spectroscopy, and related applications.

In accordance with preferred embodiments of the present invention, a color-combining apparatus is provided that has a plurality of sources of illumination, each source of illumination emitting a beam characterized by a distinct spectral range. Together, the beams are said to constitute a set of beams. The apparatus also has a polychromat for adapted defining light output properties in at least one volume upon illumination of the polychromat by the plurality of sources of illumination.

In various embodiments of the invention, the polychromat is adapted to define light output properties not only in one volume but in a plurality of volumes upon illumination of the polychromat by the plurality of sources of illumination. The light output properties defined in at least two of the plurality of volumes may be mutually distinct light output properties.

In other embodiments of the present invention, the polychromat may be adapted to combine the set of beams into an output beam. The polychromat may be further adapted to define a propagation direction of the output beam.

In further embodiments of the invention, the polychromat may be adapted to define at least one property of light in a specified volume of space, where the one property chosen from the group of properties including (i) intensity; (ii) color; (iii) color uniformity; and (iv) polarization. Where an output beam is formed, the polychromat may be adapted to define at least one property of the output beam, the one property chosen from the group of properties including: (i) intensity; (ii) color; (iii) color uniformity; (iv) divergence angle; (v) degree of collimation; (vi) polarization; (vii) focus; and (viii) beam waist.

In yet further embodiments of the invention, the distinct spectral ranges of the respective sources of illumination may be substantially spectrally non-overlapping. The color-combining apparatus may also have a computer-generated holographic plate disposed between each source of illumination and the polychromat. The plurality of sources may be, but need not be, disposed on a non-planar substrate. At least one controller may be provided for independently controlling each light source. A subset of the plurality of sources, up to the entirety thereof, may share a common electrode. The polychromat may be fabricated on a transparent material or on an absorbing material. It may be adapted to operate in a transmission mode or a reflection mode. It may be binary, multi-level or have a gradient index of refraction distribution. The polychromat may also include a parquet of polychromats.

Another embodiment of the present invention provides an enhanced-privacy display having a plurality of source pixels emitting electromagnetic radiation, each pixel characterized by a divergence angle; and a polychromat disposed adjacent to each pixel for narrowing a field of view of radiation as viewed from a position distal to the source pixels.

Yet another embodiment of the present invention provides a high-efficiency LCD display having a source of polarized backlighting, a plurality of LCD pixels disposed substantially in a plane, and a polychromat disposed between the source of polarized backlighting and the plane of LCD pixels for separating the backlight into certain spectral components.

In accordance with another aspect of the present invention, a method is provided for combining colors. The method has steps of:
a. illuminating a polychromat with electromagnetic radiation from plurality of sources, each source characterized by a distinct spectral range; and
b. combining the electromagnetic radiation from the plurality of sources such that radiation emerging from the polychromat has specified color and power uniformity and degree of collimation.

In an alternate embodiment of the invention, there may be a further step of controlling the output beam spatial distribution to produce a desired pattern or texture.

In accordance with yet another aspect of the present invention, a method is provided for at least one of multiplexing and demultiplexing optical signals. The method has steps of:

a. illuminating a polychromat with electromagnetic radiation from plurality of sources, each source characterized by a distinct spectral range and emitting a distinct spectral component;

b. combining the electromagnetic radiation from the plurality of sources for coupling into an optical conduit having an output; and c. coupling the output of the optical conduit to a second polychromat for separating the electromagnetic radiation into the distinct spectral components.

In a further aspect of the present invention, a method for high-resolution imaging is provided, with steps of:

a. exciting radiation in a sample, the radiation comprised of a plurality of spectral components indicative of distinct functionality;

b. separating the plurality of spectral components by means of a polychromat; and c. separately imaging the distinct spectral components.

In accordance with another embodiment of the invention, an improvement is provided to a spectrometer having a dispersive element for dispersing spectral components of a light input, where the improvement includes substitution of the dispersive element with a polychromat. The polychromat may be optimized for achieving a specified diffraction efficiency, or to direct spectral bands onto specified detector pixels. The polychromat may be optimized to suppress specified diffraction orders, and to increase input light acceptance of the spectrometer. The polychromat may also serve as a powered diffractive optic, focusing diffracted light onto the detector array.

BRIEF DESCRIPTION OF THE DRAWINGS

The present patent or application file contains at least one drawing executed in color. Copies of this patent with color drawing(s) will be provided by the Patent and Trademark Office upon request and payment of necessary fee.

The foregoing features of the invention will be more readily understood from the following detailed description, considered with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

The term "polychromat" shall refer to a solid medium characterized by a structured surface or inhomogeneous index of refraction, giving rise to a multiple-wavelength diffractive optic that is non-periodic and lacks rotational symmetry. The diffractive optic may be a binary or multi-level phase optic in certain embodiments, however the invention is not so limited. Examples of polychromats and teachings related to their design and fabrication may be found in US Published Application 2010-0097703 (Menon, hereinafter, the "Menon '703 Application"), and in Dominguez-Caballero, "*Design and Optimization of the Holographic Process for Imaging and Lithography,*" Ph.D. Thesis, Massachusetts Institute of Technology, February, 2010, available at http://dspace.mit.edu/handle/1721.1/57696, both of which are incorporated herein by reference.

The term "binary diffractive element" shall refer to an optical element having the property that a beam having a planar phase front undergoes one of two phase shifts at every position in a plane transverse to the propagation direction of the beam upon transmittal through, or reflection from, the element.

The term "multilevel diffractive element" shall refer to a an optical element having the property that a beam having a planar phase front undergoes one of a plurality of phase shifts at every position in a plane transverse to the propagation direction of the beam upon transmittal through, or reflection from, the element. An example is a diffraction grating which, instead of a continuous analog blaze, has quantized stepped surfaces.

As used herein, when multiple beams are said to have "distinct spectral ranges," their spectral ranges may overlap in part.

In accordance with the present invention, methods and apparatus are provided for ultra-high efficiency color mixing, to be employed, for example, for purposes of lighting, display and related applications. The methods and apparatus described herein involve the use of an optical element referred to herein as a polychromat, which allows mixing a plurality input colors, and, more particularly, to combining three or more input colors to produce a uniform output beam of white (or other color) light with high efficiency and color stability, as well as conditioning optical properties of the output beam.

Figure 1:
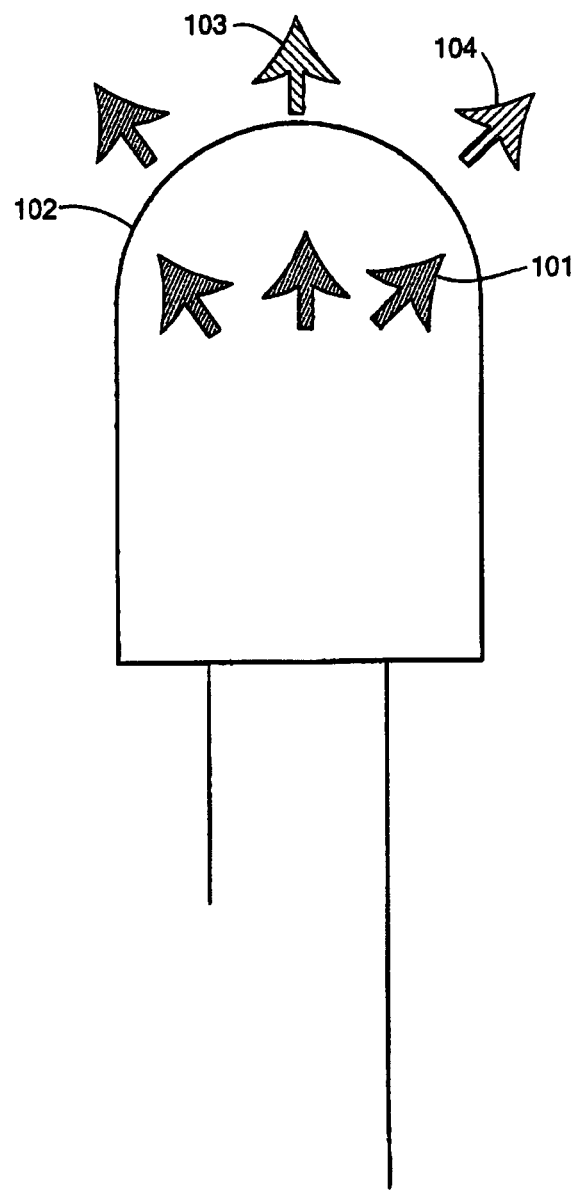
FIG. 1 schematically depicts a prior art LED with a blue source and phosphors for generation of other color components resulting in a color-mixed output.
Figure 2:
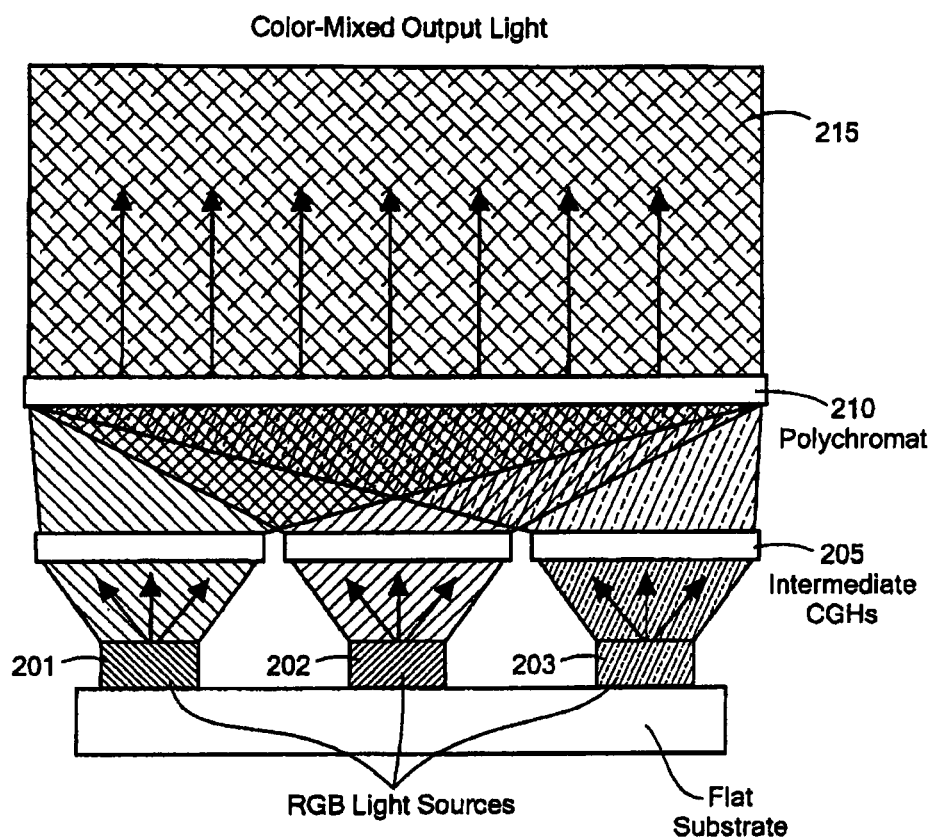
FIG. 2 is a schematic diagram of one embodiment of a color mixing system, in which light of different colors from an array of light sources (such as LEDs) illuminates a set of intermediate computer-generated holograms (CGHs) that pre-condition the light to then illuminate a polychromat, which mixes the colors, producing a color-mixed output, in accordance with one embodiment of the present invention.

A first embodiment of the invention is described with reference to a schematic depiction in FIG. 2. In the geometry depicted in FIG. 2, a set of intermediate computer-generated holograms (CGHs) 205 is used to assist in the redirection and preconditioning of the light emitted by the sources 201, 202, and 203. Of the sources, one is typically red 201, one green 202, and one blue 203, although any other spectral combination of illumination is within the scope of the present invention. Each CGH 205 is optimized for its corresponding operation wavelength to achieve high diffraction efficiency. Optimization of a CGH for high diffraction efficiency is taught in Dominguez-Caballero (2010), on pp. 47-92 and in Dominguez-Caballero et al., *Design and sensitivity analysis of Fresnel domain computer generated holograms, Int. J. Nanomanufacturing*, vol. 6, pp. 207-18 (2010), incorporated herein by reference. The light diffracted by the intermediate CGHs illuminates a polychromat 210 whose diffraction pattern then produces a color-mixed output illumination 215 as specified by the designer. While each of the spectral components of output illumination 215 is substantially co-collimated, it is to be understood that various properties of the output beam 215, such as collimation degree, intensity uniformity, rendering and color stability, can be accurately controlled by proper design and optimization of the polychromat element. Such proper design and optimization is taught in the Menon '703 Application and in Dominguez-Caballero (2010).

Figure 3:
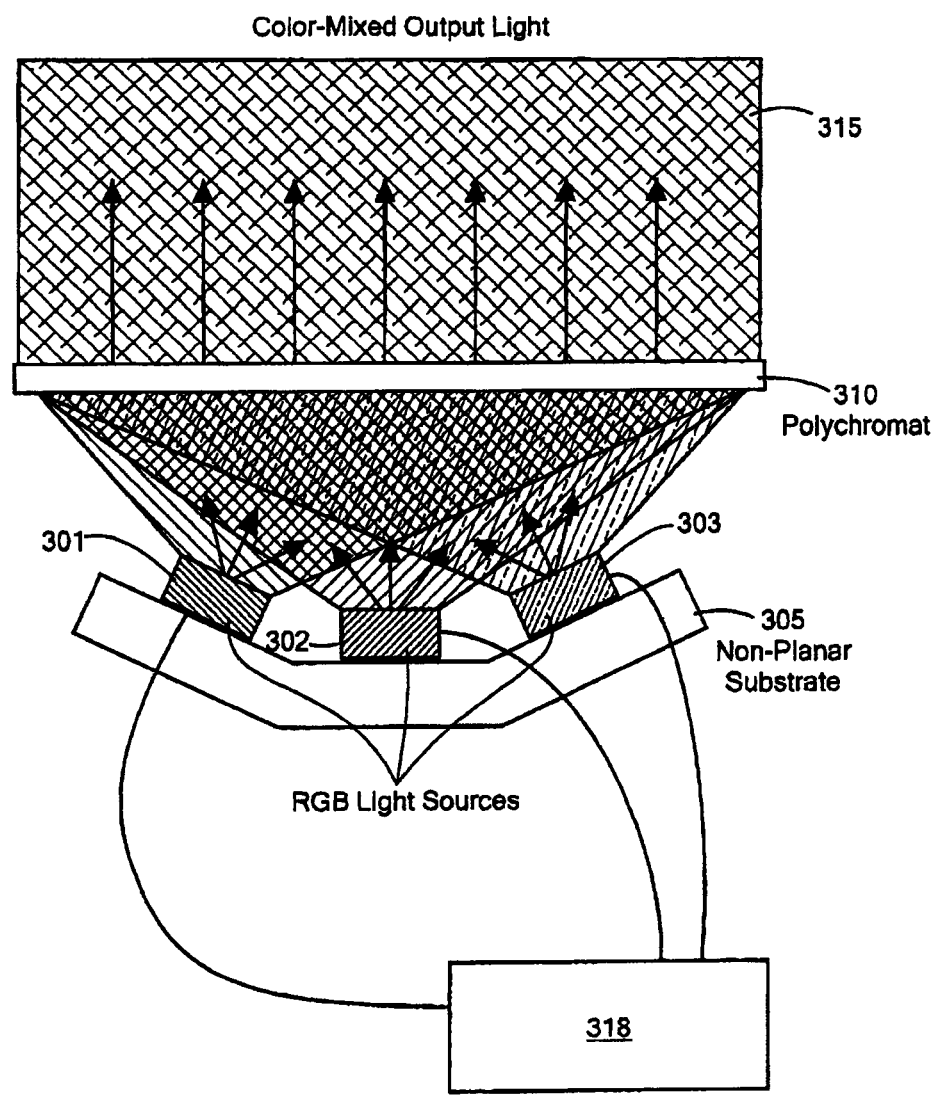
FIG. 3 depicts light sources mounted on a non-planar substrate directly illuminating a polychromat designed to perform color mixing, in accordance with another embodiment of the present invention.

An alternate embodiment of the invention is now described with reference to FIG. 3. Light sources 301, 302, and 303 are disposed in a non-coplanar fashion, such as by mounting on a non-planar substrate 305. Of the sources, one is typically red 301, one green 302, and one blue 303, although any other spectral combination of illumination is within the scope of the present invention. While emission of light sources 301-303 is typically in the visible portion of the electromagnetic spectrum, it is to be understood that apparatus and methods in accordance with the teachings provided herein may be employed in other portions of the spectrum, including, without limitation, microwave, submillimeter, infrared, and ultraviolet. By virtue of the non-coplanar mounting, intermediate CGHs are not required. The direct output from the light sources illuminates polychromat 310, which, again is designed to perform the color mixing and yield a mixed output beam 315.

Color Control

Methods and apparatus in accordance with the present invention may advantageously afford greater control over the output light than previously possible. Each of the light sources 301, 302, 303 (such as LEDs) in the array can be independently controlled by one or more controllers 318 to which each LED is electrically coupled. For example, the light output from each of the red, green and blue LEDs may be controlled independently by controlling LED input currents. This allows the primary colors to be produced at specified ratios, thereby achieving an extremely wide dynamic range of colors including white light. In this case, the polychromat is preferably designed to respond with equal and high efficiency for the 3 primary colors. In particular, the polychromat is designed to account for the fact that the light sources are staggered spatially and mix the colors appropriately.

Device Structure

Figure 4A:
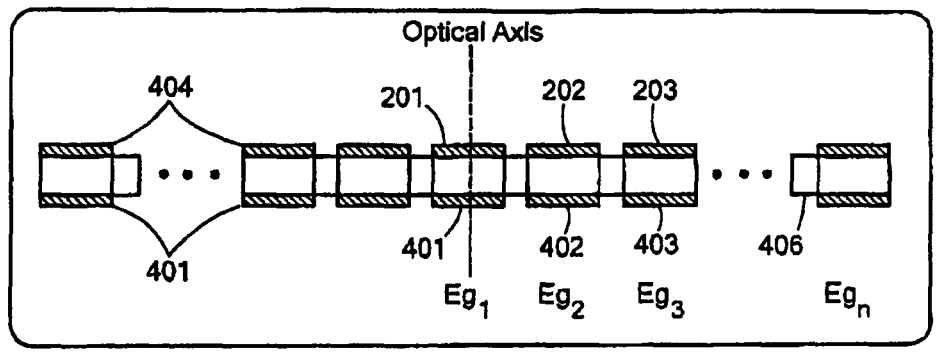
FIGS. 4(a) and 4(b) depict, respectively, cross-sectional schematics of a configuration of sources with separated bottom electrodes for each source, and with a common bottom electrode for all sources, in accordance with various embodiments of the present invention.
Figure 4B:
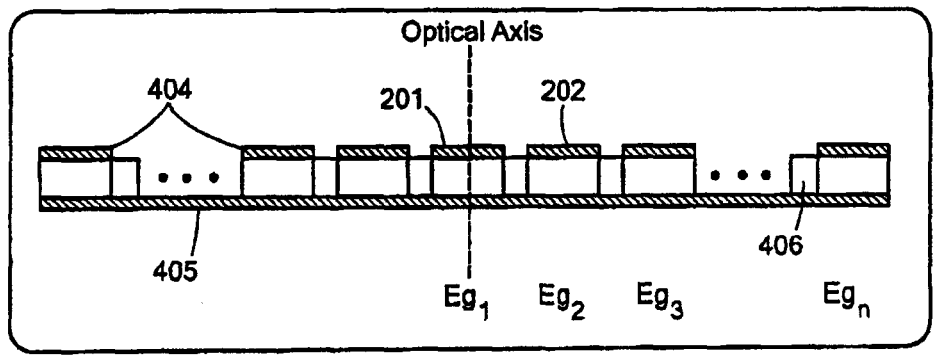

Light sources 201, 202, and 203 may be integrated into a single substrate as shown or simply be a combination of discrete elements, as illustrated in cross-sectional views in FIGS. 4(a) and 4(b). Bottom electrodes 401, 402, 403 and top electrodes 404 may be separated for each source by insulators 406, as shown in FIG. 4(a), or, alternatively, a common bottom electrode 405 may be used, as shown in FIG. 4(b). The substrate itself may be used as the bottom electrode as well. Separate electrodes are useful if the sources are connected independently via the bottom electrodes and buried conducting lines. Buried lines are preferred to preclude interference with emitted light.

The Polychromat

Polychromat 210 (shown in FIG. 2) is an optical element, preferably flat, that is numerically designed to perform the desired color mixing and beam shaping, such as collimation or specific beam divergence, for a given set of input light beams. In addition, the polychromat can be flexibly designed to produce uniform (flat top) or non-uniform (e.g., Gaussian) output intensity distributions. The polychromat can be designed to condition the light in an unrestricted or restricted three-dimensional region in space. One or more output regions may be defined. The design of polychromats to accomplish the specified definition of intensity distributions in volumetric regions is fully laid out in the teachings of the Menon '703 Application and Dominguez-Caballero (2010). Additional degrees of freedom provided by the polychromat makes it suitable for a wide range of applications subject to different requirements and constraints.

Figure 5:
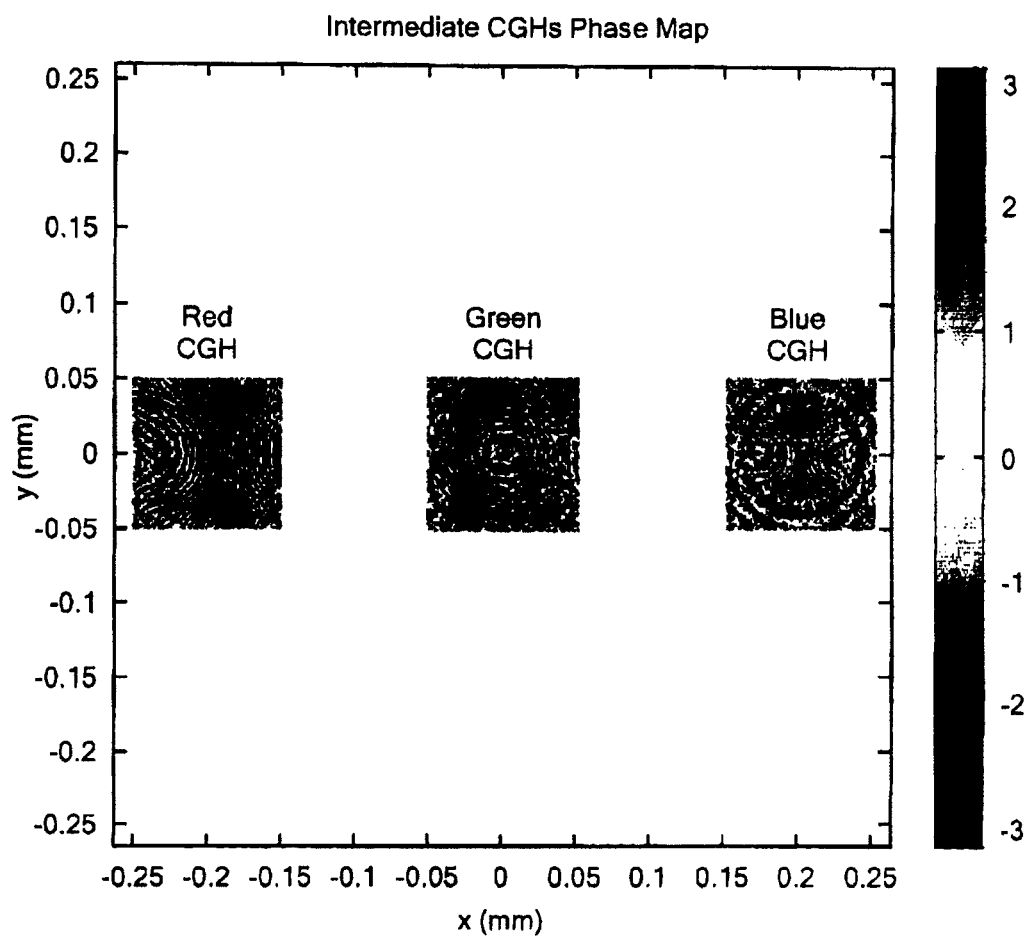
FIG. 5 is a phase map for optimized intermediate CGHs used in a RGB color-mixing system in accordance with an embodiment of the present invention, based on the geometry of FIG. 2.

In accordance with preferred embodiments of the invention, polychromat 210 is composed of micro or nanostructured corrugations on a substrate such as glass. The location and height of the corrugations are determined based on non-linear optimization algorithms subject to a set of constraints given by the selected geometry and target application, as described in Dominguez-Caballero (2010). For example, for the geometry shown in FIG. 2, the optimization problem is divided in two parts, one involving the optimization of the intermediate CGHs and the other for optimizing the polychromat. These two optimization blocks can be coupled together to improve the global system efficiency. As an example, FIG. 5 shows the optimized phase map for three intermediate CGHs designed for a RGB system with center wavelengths: $\lambda=650$ nm (red), $\lambda=530$ nm (green), and $\lambda=480$ nm (blue). The intermediate CGHs also consist of micro/nanostructured corrugations on a substrate. The physical height of the corrugations is related to resulting phase map according to:

$$T(x, y) = \frac{\lambda \phi(x, y)}{2\pi(n_2 - n_1)}, \quad (1)$$

where T(x, y) is the corrugations height map, λ(x, y) is the phase map, $n_2$ and $n_1$ are the refractive indices of the substrate and surrounding medium respectively. In a preferred embodiment of the invention, CGHs 205 (shown in FIG. 2) are 100 μm×100 μm in size, with a pixel pitch of 0.5 μm and are placed approximately 1 mm away from the LED sources. The LED sources are preferably 15 μm×15 μm in size, and are arranged in a line spaced by approximately 200 μm.

Figure 6:
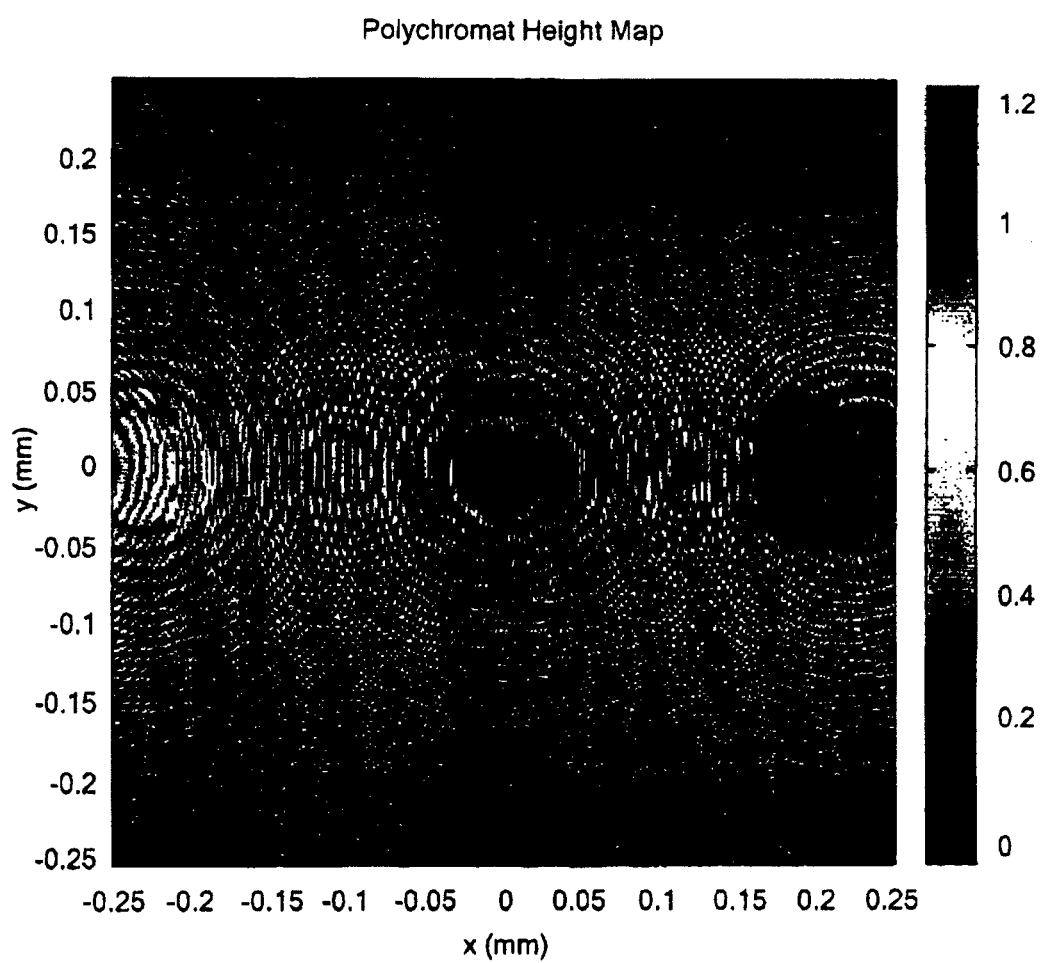
FIG. 6 is a height map for an optimized polychromat used in a RGB color-mixing system in accordance with an embodiment of the present invention, based on the geometry of FIG. 2.

A height map of an optimized polychromat is shown in FIG. 6. In the example shown, both the intermediate CGHs and the polychromat have the same pixel pitch of 0.5 μm and are assumed to be fabricated on a fused silica substrate with corresponding dispersion values taken into account.

Figure 7:
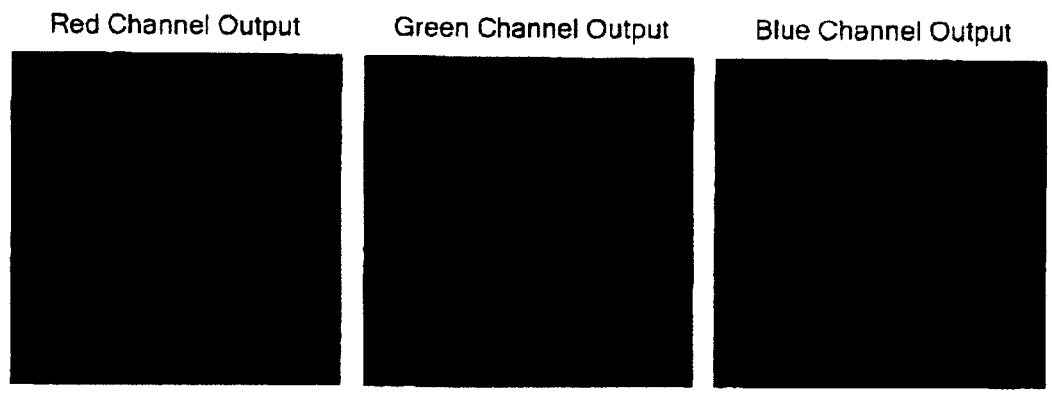
FIG. 7 depicts simulated output intensity distributions, for each spectral channel independently, in a plane disposed 1 mm behind the polychromat, in accordance with an embodiment of the present invention.
Figure 8:
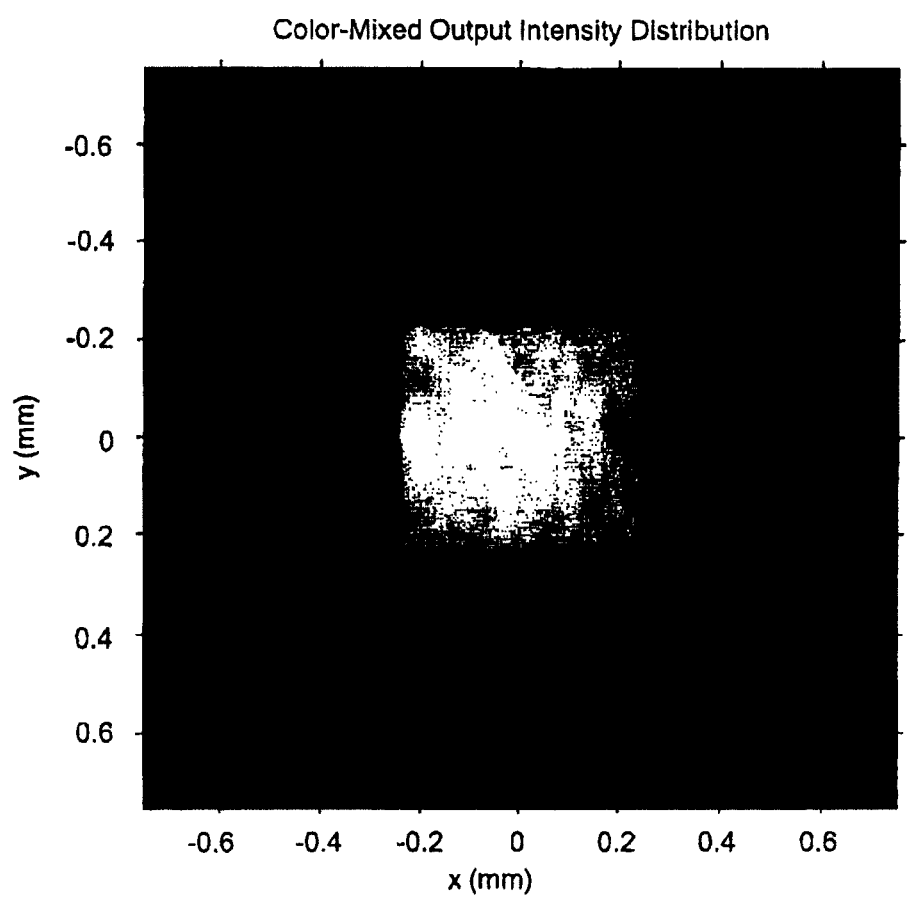
FIG. 8 depicts a simulated color-mixed output intensity distribution, in accordance with an embodiment of the present invention.

FIG. 7 shows a simulated output intensity distribution for each spectral channel independently, where a distinct single LED is "turned on" in each plot. The intensity distribution is computed at an output plane 1 mm away from the polychromat. As can be seen, each spectral channel is correctly collimated and outputs a high-efficiency uniform intensity distribution. The system's mean diffraction efficiency is 80.83%. FIG. 8 shows the corresponding color-mixed output (all LEDs are "turned on").

Figure 9:
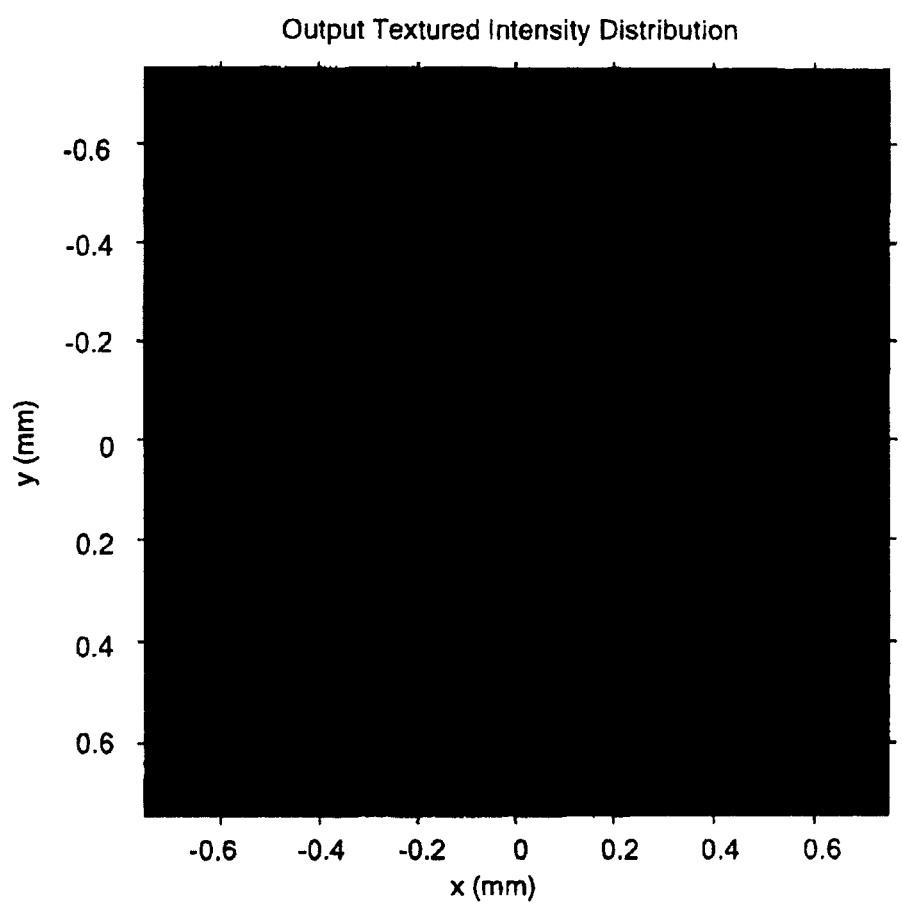
FIG. 9 depicts a simulated "textured" output intensity distribution, in accordance with an embodiment of the present invention.

In accordance with alternate embodiments of the present invention, polychromat 210 may advantageously produce "textured" illumination, suitable for such applications as entertainment lighting, for example. FIG. 9 shows an example of the output textured intensity distribution after the polychromat optimized for a RGB color-mixing system based on the geometry of FIG. 2.

Privacy Filter for Displays

Figure 10:
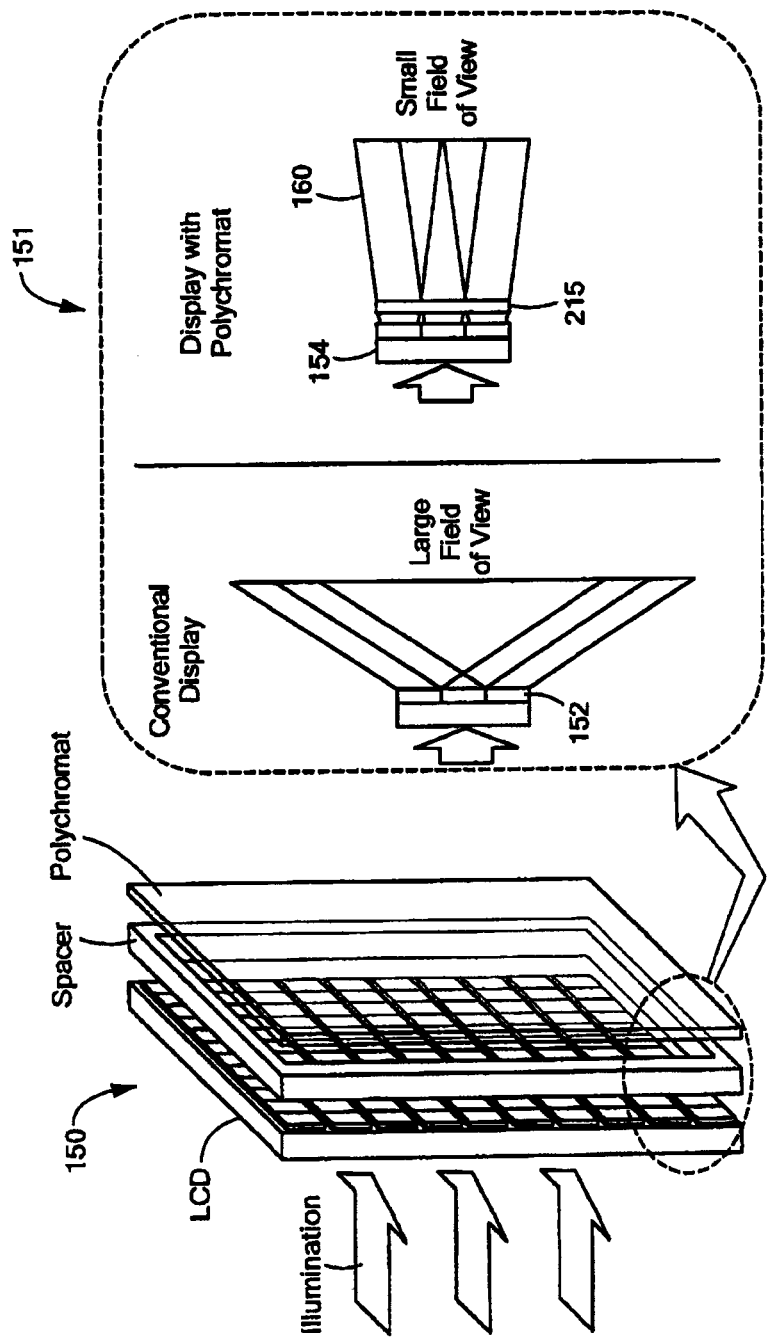
FIG. 10 shows privacy enhancement of a display in accordance with an embodiment of the present invention.

Referring, now, to FIG. 10, in accordance with further embodiments of the present invention, polychromat 210 may be designed to decrease the field-of-view (FOV) of a display 150 and thereby enhance privacy. In a conventional display 151, light from each pixel 152 diverges at a large angle 155. This makes the display viewable at larger angles, and thus impedes privacy. In accordance with embodiments of the present invention, polychromat 215 is designed such that the angular divergence of the output light 160 from the pixel 154 is reduced as shown. If the polychromat 215 is placed close enough to the pixels as shown, then each color can have its own design. Hence, the polychromat may consist of tiled blocks, each block designed for the wavelength incident on it. Each block is then angle- (i.e., space-) multiplexed to account for the wide extent of the source. The color mixing in this case is achieved naturally by the propagation of light. If the gap between the polychromat and the pixels is larger, then wavelength multiplexing can be employed in the design.

Ultra-Efficient Color Filter for Displays

Figure 11:
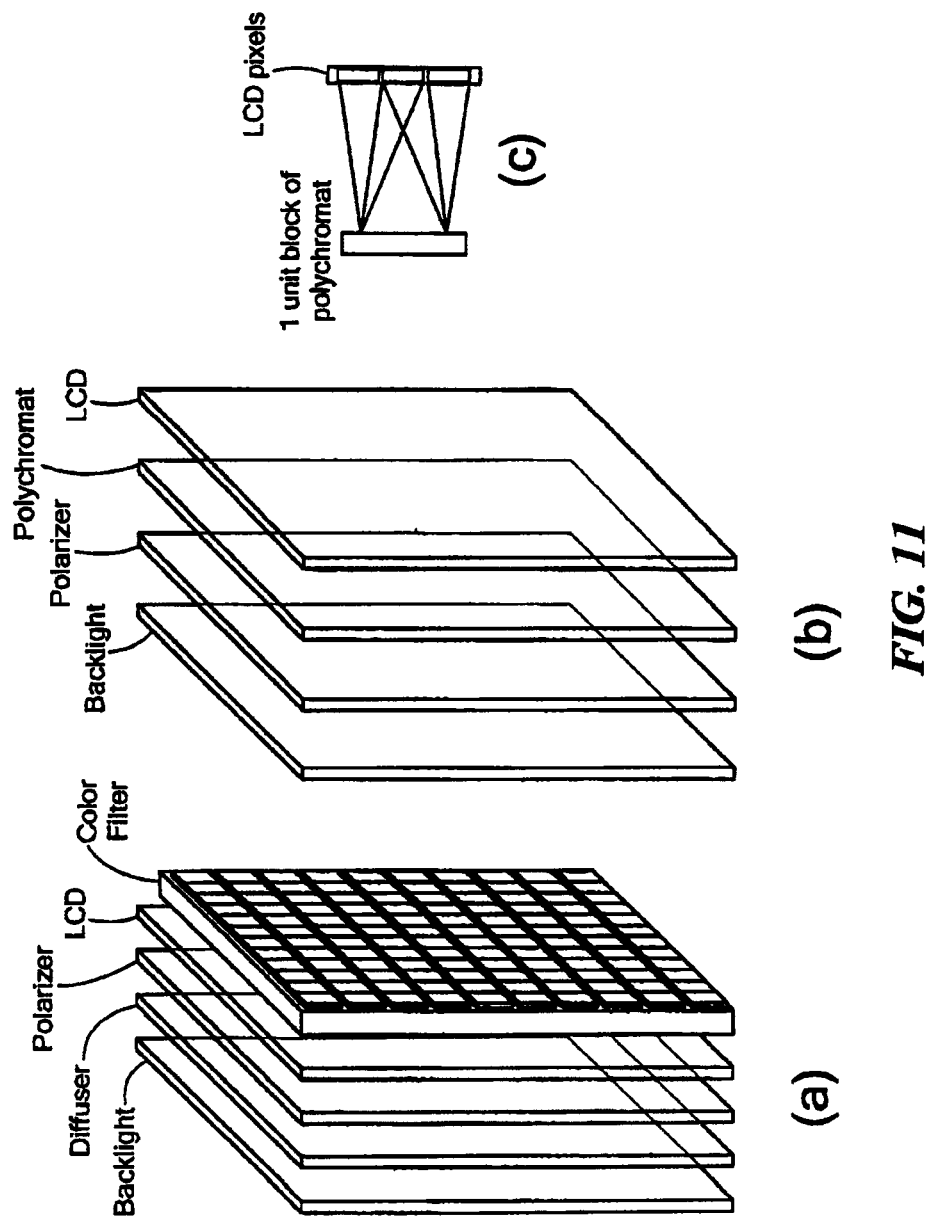
FIG. 11(a) shows a Conventional display.
FIG. 11(b) a polychromat-based display.
FIG. 11(c) a polychromat block separating the RGB colors onto separate LCD pixels, in accordance with embodiments of the present invention.

Polychromat 215 may also be advantageously used to increase the efficiency of color filters in LCD displays. This application is illustrated in FIGS. 11(a)-11(c). In a conventional LCD display, the primary colors are achieved by absorbing color filters, as shown in FIG. 11(a). White light, after passing through an LCD pixel, is absorbed in a conventional color filter to create the primary colors, red, green and blue (RGB). Since this works by absorption, its efficiency is less than 33%. Polychromat 215 is used to simply separate the RGB colors from the white light and have the separated colors incident on separate LCD pixels (or pixel sectors) as shown in FIGS. 11(b) and (c). The efficiency can be as high as 80-90%, limited only by the design of the polychromat. The diffuser is removed prior to the polychromat in order to decrease the acceptance angle. In this case, the diffuser may be placed after the polychromat (not shown in the illustration).

Separation of Fluorescent Signals for High-Resolution 5-D Imaging

Recently, several techniques have been developed to achieve deep sub-diffraction-limited resolution in 3-D using switchable fluorophores in fluorescence microscopy. Such techniques are described, for example, by:

Hell, et al., *Breaking the diffraction resolution limit by stimulated emission: stimulated-emission-depletion fluorescence microscopy*, Opt. Lett., vol. 19, pp. 780-82 (1994);

Huang, et al., *Three-Dimensional Super-Resolution Imaging by Stochastic Optical Reconstruction Microscopy*, Science, vol. 319, pp. 810-13 (2008);

[4] H. Shroff, et al., *Live-cell photoactivated localization microscopy of nanoscale adhesion dynamics*, Nature Methods, vo. 5, pp. 417-23 (2008); and

[5] Hess, et al., *Ultra-High Resolution Imaging by Fluorescence Photoactivation Localization Microscopy*, Biophys. J., vol. 91, pp. 4258-72 (2006), all of which publications are incorporated herein by reference.

Figure 12:
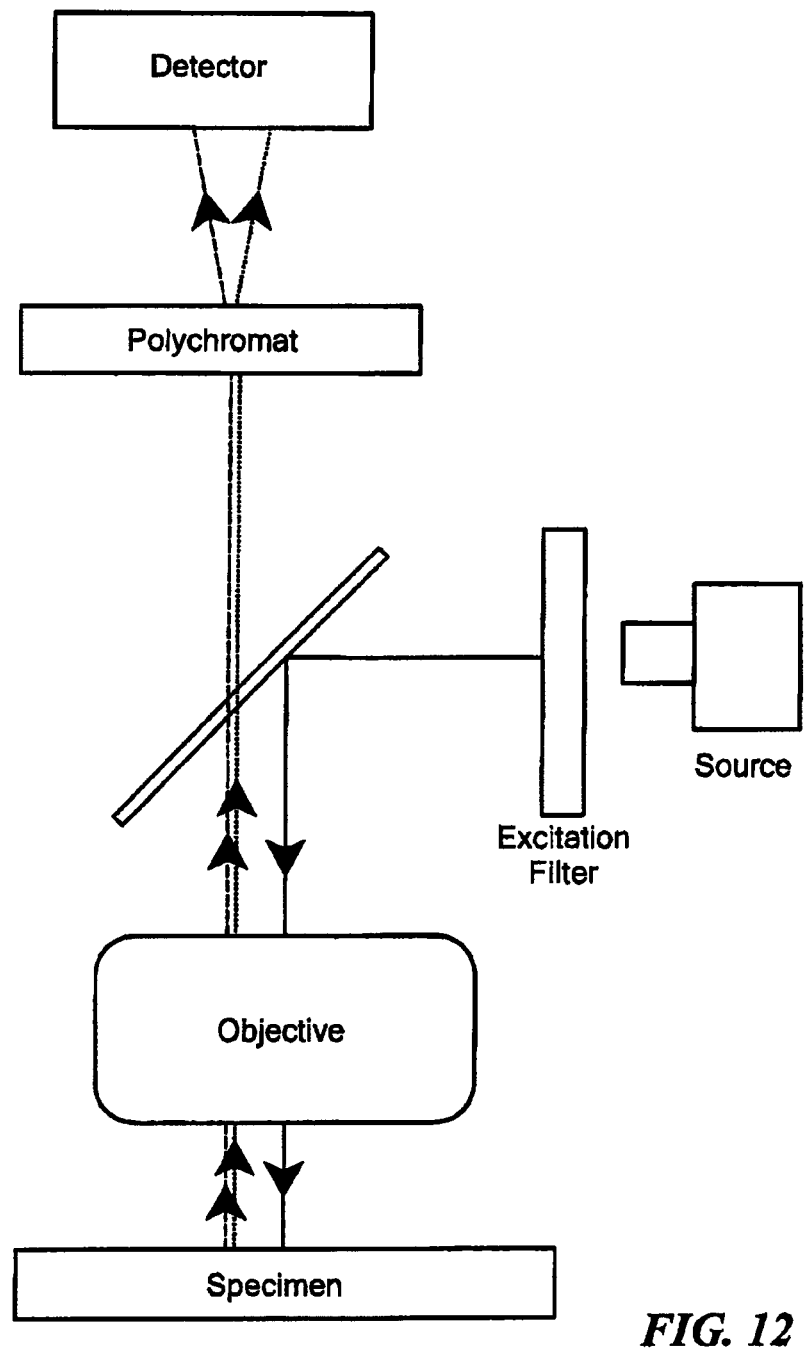
FIG. 12 shows the use of a polychromat for color separation in the context of sub-diffraction-limited resolution imaging, in accordance with embodiments of the present invention.

Various of these techniques also use fluorophores that emit at different wavelengths for functional specificity. In this case, the signals are passed through interference filters while imaging. This is achieved by separating the emission signals by time or by diverting the different colors via dichroic filters onto separate detectors. A polychromat, in accordance with embodiments of the present invention, can offer a far simpler approach to color separation. This allows for the different emission signals to be detected simultaneously, thus allowing for high temporal resolution (or fast imaging). This also allows for the use of the same CCD camera as long as separate pixels may be assigned to the separate colors. In most approaches this is clearly feasible. The polychromat is placed in the position of the interference filter. It separates the signal by wavelength and assigns each signal-wavelength to a separate pixel block on the CCD camera as indicated in FIG. 12. Thus, this allows for high resolution imaging in all 3 spatial dimensions as well as the additional 2 dimensions of color (for specificity) and time (for fast processes).

Figure 13:
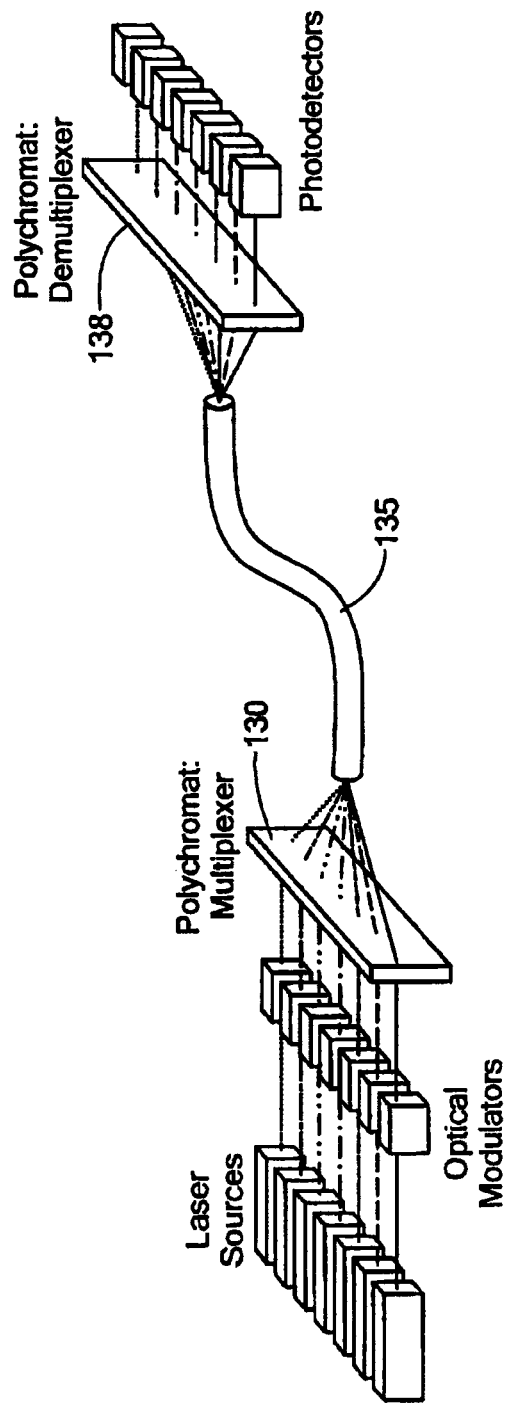
FIG. 13 shows the use of a polychromat for an optical interconnect in both multiplexing and demultiplexing steps.

Multiplexer and Demultiplexer for Optical Interconnects and Optical Communications Referring, now, to FIG. 13, a polychromat 130 can be used as a multiplexer and demultiplexer for optical interconnects such as intra-board chip-to-chip modules. A discussion of challenges confronting such interconnects may be found in Mill, *Rationale and Challenges for Optical Interconnects to Electronic Chips*, Proc. IEEE, vol. 8, pp. 728-49 (2006). In the multiplexing step, polychromat 130 is designed to combine the different discrete parallel input channels and redirect them into a single physical channel, such as an optical fiber 135, for efficient input handling. In the demultiplexing step, the combined broadband signal coming out of the physical channel is spectrally separated, and each spectral band is redirected to its corresponding photodetector for efficient output handling. Polychromat 138 allows multiple channels to be handled in parallel with high conversion efficiency for ultra-high-speed data transfer applications. A similar design may be used advantageously for multiplexers and demultiplexer used in optical communications.

Optical Spectrometers

Figures 14A, 14B:
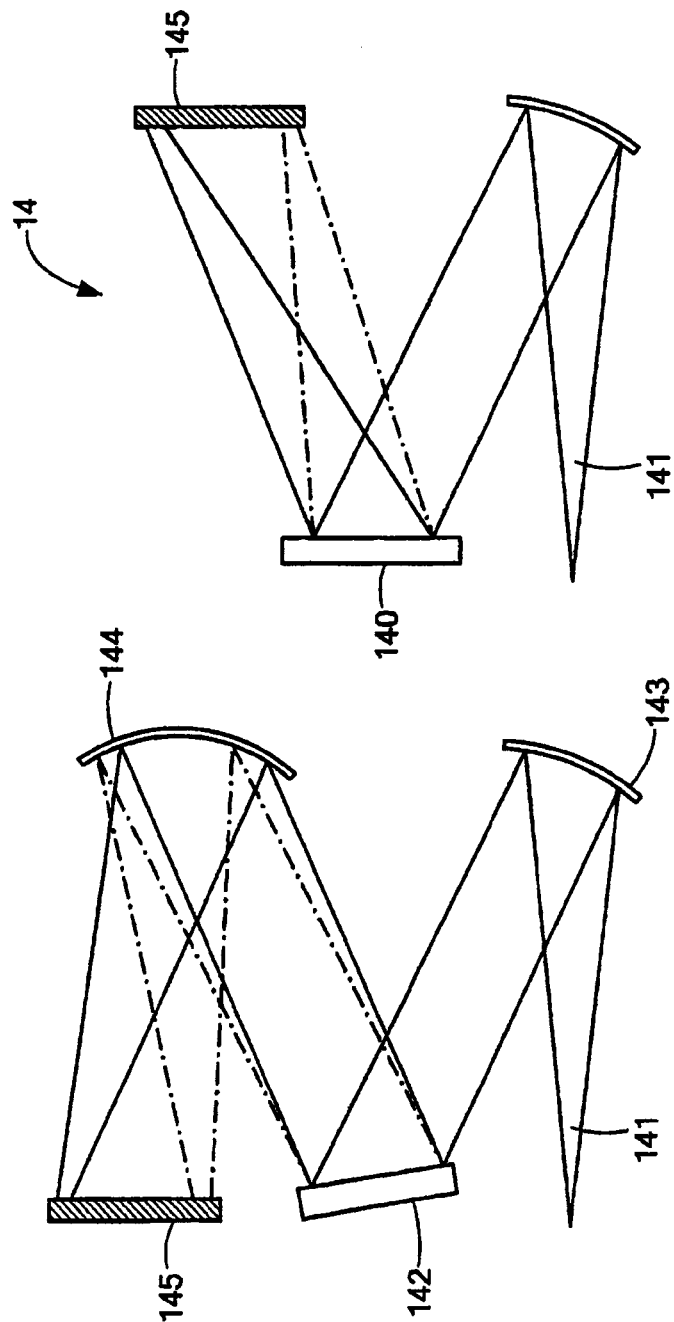
FIG. 14(a) shows a prior art conventional spectrometer based on a diffraction grating for dispersing input light.
FIG. 14(b) shows the use of a polychromat in place of the dispersive element, in accordance with embodiments of the present invention.

Referring, now, to FIGS. 14(a) and 14(b), in alternate embodiments of the present invention, a polychromat 140 is used in place of a dispersive element 142, such as a diffraction grating, for conditioning the input light 141. Conventional spectrometers based on diffraction gratings typically suffer from low efficiencies as the grating is optimized for a single wavelength. In contrast, the polychromat 140 may be design based on multiple wavelengths and hence increasing the efficiency of the system. In addition, using the polychromat, the amplitude distribution of the spectral output can be controlled to produce a uniform or "colored" output distribution, acting effectively as a band-pass filter. The light output from the polychromat can be optimized to match the spectral bands onto the appropriate detector pixels. The polychromat may be design to avoid the use any additional secondary optics.

FIG. 14(a) shows a conventional Czerny-Turner spectrometer, although all spectrometer configurations are within the scope of the present invention. Input light 141 is first reflected by a collimating mirror 143 and redirected to the diffraction grating 142. The diffraction grating 142 disperses the light into multiple spectral bands, which are then focused by an imaging mirror onto a detector array 145. FIG. 14(b) shows a spectrometer, designated generally by numeral 14, that incorporates a polychromat 140. Input light 141 is again collimated and redirected, here, to the polychromat 140. The polychromat 140 disperses the input beam into multiple spectral bands and performs an imaging operation, redirecting the light to the appropriate regions on detector array 145. The polychromat shown operates in reflection mode and may be curved (or "powered"), thereby allowing for elimination of one of the secondary optics.

Fabrication of the Polychromat

Polychromat 215 may be fabricated from a glass, plastic or other dielectric with high transmission across the region of the electromagnetic spectrum (such as the visible region of the spectrum) over which it is employed. Alternatively, it may be fabricated from a metallic surface and operate in reflection mode. Conventional fabrication techniques such as scanning optical-beam lithography (SOBL), gray scale lithography or electron-beam lithography may be implemented, as described, for example in Gil et al., *The Promise of Diffractive Optics in Maskless Lithography, Microelectron. Eng.*, vols. 73-74, pp. 35-41 (2004), Galus, et al., *Replication of Diffractive-Optical Arrays via Photocurable Nanoimprint Lithography*, J. Vac. Sci. Technol. B., vol. 24(6), pp. 2960-63 (2006), and in U.S. Pat. No. 5,774,239, to Feldman.

Figure 15:
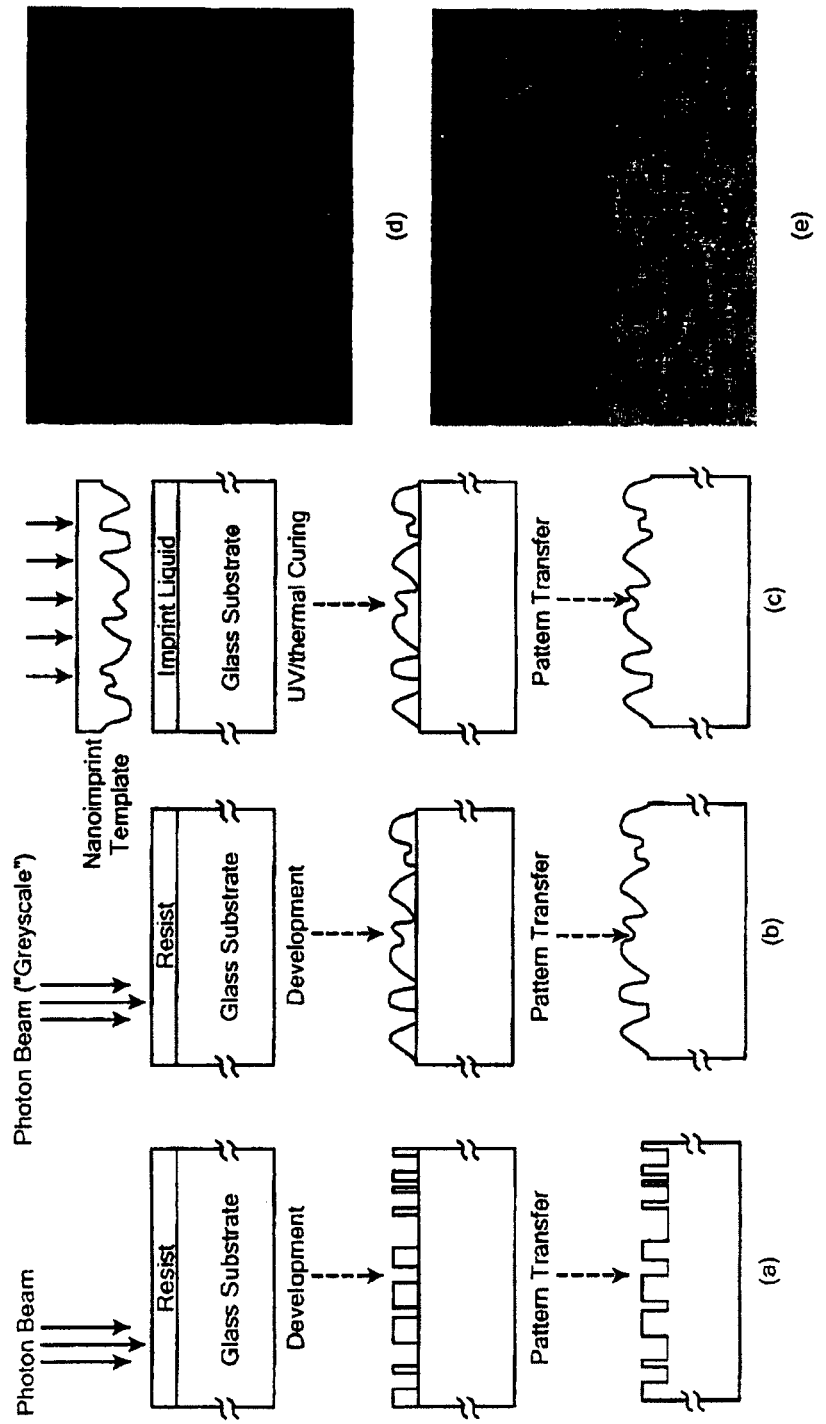
FIGS. 15(a)-15(e) show steps of polychromat fabrication based on scanning-optical beam lithography and replication using nanoimprint lithography: (a) conventional method for binary structures; (b) grayscale method for multi-level structures; (c) replication process; (d) and (e) scanning-electron micrographs of a blazed grating and cylindrical microlens fabricated using grayscale technique, all in accordance with embodiments of the present invention.

To reduce the manufacturing costs a replication process, such as roll-to-roll embossing, may be adopted. All of these fabrication techniques have been shown to work well for fabricating micron-sized features over relatively extended areas with high fidelity. FIGS. 15(a)-15(e) show a fabrication example based on SOBL and the nanoimprint replication process. FIG. 15(a) shows the conventional patterning approach used for fabricating binary structures. To fabricate multi-level structures, a "grayscale" patterning (variable dose) technique is implemented as shown in FIG. 15(b). The fabrication of multi-level structures, such as blazed gratings and cylindrical lenses, has been demonstrated, as shown in FIGS. 15(d) and (e). It is feasible to create such structures in a transparent plastic, which, when cured, are rigid and robust to wear. Such a process avoids the pattern-transfer step. Scalability to large-area sources may be achieved, in accordance with further embodiments of the present invention, with a parquet of polychromats.

The embodiments of the invention described herein are intended to be merely exemplary; numerous variations and modifications will be apparent to those skilled in the art. All such variations and modifications are intended to be within the scope of the present invention as defined in any appended claims.

What is claimed is:

1. A high-efficiency LCD comprising:
   a. a source of polarizing backlighting;
   b. a plurality of LCD pixels disposed substantially in a plane;
   c. a polychromat disposed between the source of polarized backlighting and the plane of LCD pixels for separating the backlight into spatially distinct and spectrally overlapping components; and
   d. a diffuser disposed distal to the polychromat with respect to the source of polarizing backlighting.

2. A color-separating component for a display comprising:
   a polychromat for disposition between a source of backlight and a plane of LCD pixels,
   wherein the polychromat is adapted to separate the backlight into specified spatially distinct and spectrally overlapping components.

3. The color-separating component of claim 2, wherein the polychromat is adapted to direct overlapping spectral components onto distinct pixels.

4. The color-separating component of claim 2, wherein the polychromat is comprised of corrugations on a substrate.

5. The color-separating component of claim 2, wherein the polychromat is comprised of corrugations on glass.

6. The color-separating component of claim 2, wherein the polychromat includes a multi-layer structure.

7. The color-separating component of claim 2, further comprising a post-diffuser, disposed adjacent to the polychromat, distal to the source of backlight.

8. The color-separating component of claim 2, wherein the polychromat is manufactured using at least one of a roll-to-roll embossing process, a scanning optical-beam lithography process, grayscale photolithography and electron-beam lithography.

* * * * *